United States Patent [19]

Blomberg et al.

[11] Patent Number: 5,561,523
[45] Date of Patent: Oct. 1, 1996

[54] ELECTRICALLY TUNABLE FABRY-PEROT INTERFEROMETER PRODUCED BY SURFACE MICROMECHANICAL TECHNIQUES FOR USE IN OPTICAL MATERIAL ANALYSIS

[75] Inventors: Martti Blomberg, Vantaa; Markku Orpana, Espoo; Ari Lehto, Helsinki, all of Finland

[73] Assignee: Vaisala Oy, Helsinki, Finland

[21] Appl. No.: 386,773

[22] Filed: Feb. 10, 1995

[30] Foreign Application Priority Data

Feb. 17, 1994 [FI] Finland ................................. 940742

[51] Int. Cl.$^6$ ..................................................... G01B 9/02
[52] U.S. Cl. ............................................................ 356/352
[58] Field of Search ................................................ 356/352

[56] References Cited

U.S. PATENT DOCUMENTS 4,859,060  8/1989  Katagiri et al. .
5,142,414  8/1992  Koehler ...................................... 356/352

FOREIGN PATENT DOCUMENTS 681047  12/1992  Switzerland .

OTHER PUBLICATIONS

Aratani: et al., Surface Micromachined Tuneable Interferometer Array, Jun. 7–10, 1993, pp. 678–681.

Primary Examiner—Samuel A. Turner
Assistant Examiner—Amanda Merlino

[57] ABSTRACT

An electrostatically tunable Fabry-Perot interferometer produced by surface micromechanical techniques is used in optical material analysis as an optical sweeping filter in which the optical measurement wavelength is centered at a wavelength $\lambda$. The Fabry-Perot interferometer based sensor structure comprises a body block, two essentially parallel mirrors bonded to the body block, of which mirrors at least one is partially transmitting and movable relative to the body block. The mirrors are spaced maximally by a few half-wavelengths, $\lambda/2$, from each other, and both of the mirror structures include integral electrode structures capable of effecting an electrostatic force between the mirror structures. The movable mirror structure is provided with structurally weakened regions surrounding the optical area of the mirror so as to facilitate keeping the optical area at a maximum degree of flatness. At least one of the electrode structures surrounds the optical area so as to achieve a mechanical lever action and avoid galvanic contact between the electrode of the movable mirror structure and the electrode of the fixed mirror structure.

17 Claims, 4 Drawing Sheets

ELECTRICALLY TUNABLE FABRY-PEROT INTERFEROMETER PRODUCED BY SURFACE MICROMECHANICAL TECHNIQUES FOR USE IN OPTICAL MATERIAL ANALYSIS

The invention is related to an electrically tunable Fabry-Perot interferometer produced by surface micromechanical techniques.

The invention is intended for applications in optical material analysis techniques in the visible to infrared, VIS-IR, range.

Nondispersive optical spectrum analyzers conventionally use different types of optical filters. An important category of these is comprised by bandpass filters which are generally tuned to a fixed wavelength. If measurement at two wavelengths is desired, two filters are required with a change-over mechanism to change the filter position in an appropriate manner, or alternatively, a separate detector is placed behind each filter. The filter change operation is conventionally implemented by means of a turntable to which the filters are attached. During the rotation of the turntable, an AC voltage (or current) is obtained as the detector output signal which is a more advantageous signal form than a DC signal.

A problem of the turntable mechanism is its relatively short service life due to wear of the bearings. An advantageous embodiment would be a filter construction in which the bandpass center wavelength could be tuned electrically without the need for any movable parts involving wear in use. In the following, such an invention is disclosed.

Electrostatically tunable, silicon-based interferometers fabricated by micromechanical techniques are known from publications J. H. Herman and D. J. Clift, "Miniature Fabry-Perot Interferometers Micromachined in Silicon for Use in Optical Fiber WDM Systems," Digest of Technical Papers, Transducers '91, p. 372, San Francisco 1991; K. Aratani et al., "Surface Micromachined Tuneable Interferometer Array," Digest of Technical Papers, Transducers '93, p. 678, Yokohama 1993; and Katagiri et al., U.S. Pat. No. 4,859,060.

The construction disclosed in the cited publication by J. H. Herman and D. J. Clift is comprised by a bulk component made by micromechanical techniques from three silicon wafers. Such a construction requires auxiliary electrostatic deflection electrodes for the parallelism control of the interferometer mirrors.

The cited publication by K. Aratani et al. discloses a micromechanical, electrostatically tunable interferometer array for use in the visible light range. The size of the individual interferometers in the array is as small as 20×20 $\mu m^2$. Interferometers of such small size can be used only in conjunction with single-mode optical fibers.

The construction disclosed in U.S. Pat. No. 4,859,060 comprises two thick wafers bonded together to form an interferometer. The length of this structure is adjusted by controlling the electrostatic attraction force. A disadvantage of this construction is that the mirror surface is bent into a spherical shape, because no corrective measures are taken in the construction to control the mirror shape.

The control range of all above-described interferometers is maximally approx. 30%, in practice approx. 20%, of the rest length of the interferometer.

Use of temperature control for the tuning of an optical interferometer is known from DE Pat. No. 39 23 831, in which silicon is used as the thermo-optic medium between the mirrors of the interferometer. The refractive index of a thermo-optic medium is a strong function of temperature. Heating/cooling of the medium is implemented by means of Peltier elements placed on both sides of the interferometer. The optical length of the etalon is selected so that the spacing of the passband line wavelengths of the etalon is the same as the spacing of the spectral rotation-vibration absorption lines of the gas to be analyzed. In EP Pat. Application 0 196 784 the temperature dependence of the refractive index of silicon is utilized in a fiber-optic technique of temperature measurement.

The embodiment disclosed in DE published application 36 11 852 has a shortcoming of slow tuning rate due to the large thermal mass involved. Further, the fabrication technique employed herein has a problem of achieving parallelism of the interferometer mirror surfaces. Moreover, the silicon medium in the interferometer etalon must have an exactly correct thickness. The cooling/heating of the interferometer is accomplished by means of Peltier elements having a hole at the optical axis of the interferometer. Use of such elements causes problems in production as their mounting requires adhesive bonding. These components are nonstandard, and therefore, expensive. The embodiment taught in the said publication uses metallized mirrors, whereby the optical transmission of the interferometer component remains rather poor.

It is an object of the present invention to overcome the drawbacks of the above-described techniques and to achieve an entirely novel type of electrically tunable Fabry-Perot interferometer produced by surface micromechanical techniques, said interferometer being suited for use as a tunable filter component in optical material analysis.

The invention is based on placing the electrodes controlling the optical length of the electrically tunable Fabry-Perot interferometer element so that at least one of the electrodes is located entirely outside the optical area.

More specifically, the above objects are achieved by providing a Fabry-Perot interferometer a body block, a first mirror structure mounted on the body block, the first mirror structure being semitransmitting and movable relative to the body block, the first mirror including an optical area and structurally weakened regions in a periphery of the optical area, wherein the structurally weakened regions maintain an initial shape of the optical area during movement of the first mirror structure, a second mirror structure mounted on the body block, the second mirror being parallel to and spaced from the first mirror structure, a first electrode structure, integral with the first mirror structure, and a second electrode structure, integral with the second mirror structure, wherein at least one of the first and second electrode structures includes an electrode outside the optical area.

The invention offers significant benefits.

The chief behest is that the control range of the interferometer according to the invention is much wider than that available by conventional constructions. In the extreme case the interferometer length is controlled to zero, that is, the interferometer etalon bottoms, the parts touching each other are potential-free, thus exhibiting no greater tendency to stick to each other.

The reflection/transmission curve of the interferometer according to the invention retains its flank shape during the control of the interferometer, since the peripheral perforation of the diaphragm structure permits flexion at the perforation, thus retaining the planar shape of the optical area over the entire tuning range.

Furthermore, the interferometer provides an easier control method, because displacement of the mirror's optical area is a smoother function of control voltage than in a conventional construction, where the mirror movement becomes very steep when the closing voltage of the interferometer etalon gap is approached.

Silicon is a superior material as to its mechanical properties as it obeys Hooke's law up to the yield stress and exhibits no hysteresis at temperatures below 600° C.

An oxide or nitride can be grown onto a silicon layer, thus making it resistant to chemicals. Elements made from silicon may also be bonded together using silicon-silicon or glass bonds.

Conventional structures use either silicon dioxide or nitride in the electrical dielectric layers. The present invention achieves structural advantages by using undoped or weakly doped polysilicon as the dielectric layers, whereby the upper surface of the interferometer can be fabricated to a higher degree of flatness, and consequently, its bonding to another element is easier.

In the following, the invention will be examined in more detail by means of exemplifying embodiments with reference to the attached drawings, in which.

The sectional illustrations given in the above-mentioned diagrams are not shown to scale, but rather, the purpose of the diagrams is to elucidate the method of producing the electrode as a layered structure using micromechanical techniques. The actual dimensions will be given later in the text.

Figure 3:
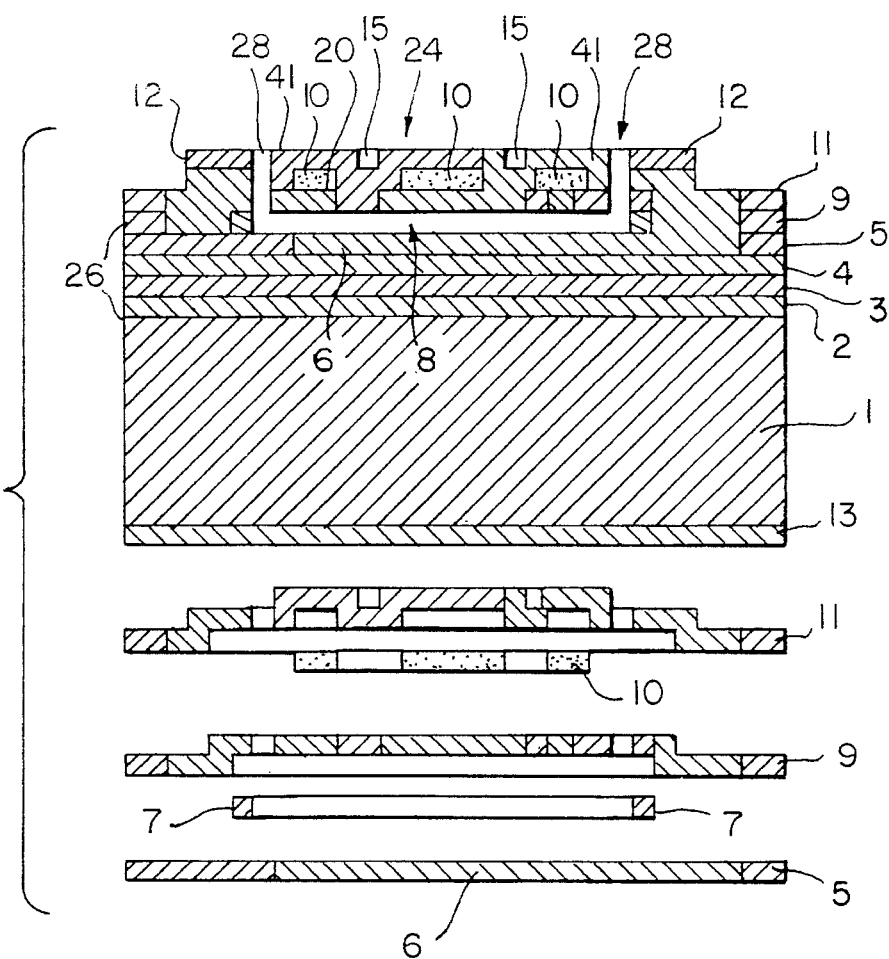
FIG. 3 is a sectional side view of a Fabry-Perot interferometer embodiment according to the invention adapted for operation at wavelengths at which silicon is transmissive.

With reference to FIG. 3, the terms denoting the elements are as follows:

A silicon substrate 1 denotes a silicon wafer or part thereof.

A lower mirror 26 denotes a multilayer structure fabricated onto the silicon substrate 1.

The interferometer length is determined by a layer 7 fabricated onto the lower mirror 26. In the illustrated structure, this layer has a thickness equal to the optical rest length of the interferometer. The region at which material has been removed is called an etalon 8 of the interferometer.

An upper mirror 41 is a multilayer structure fabricated onto the etalon 8.

A center electrode 6 and 22, as well a ring electrode 20, are formed by doping the silicon of the lower mirror 26 or the upper mirror 41 at given regions into conductive electrodes to which the deflection voltage of the mirrors is applied. Typically, the shape of the electrodes has circular symmetry, while also other shapes are feasible.

An optical area 24 denotes that region of the upper mirror 41 which remains planar during the deflection of the mirrors.

A short-etalon interferometer denotes such an interferometer in which the optical length of the etalon is maximally a few half-wavelengths.

Rest wavelength denotes the longest wavelength corresponding to the rest length of the interferometer etalon.

Rest length denotes the rest length of the interferometer etalon at no deflection voltage applied.

The optical area 24 of the upper mirror 41 is micromachined to include holes 28 through which material can be etched away so as to form the etalon 8 of the interferometer.

A thinned or structurally weakened region 15 of the upper mirror 41 acts as the deflecting subregion of the optical area. The ring electrode 20 advantageously surrounds both the optical area 24 and the thinned region 15.

A Fabry-Perot interferometer according to the invention has such a construction in which the etalon length can be controlled by electrostatic deflection. Thus, the center wavelengths of the interferometer passbands can also be controlled. The basic equation of the Fabry-Perot interferometer can be written as $$2nd = m\lambda \quad (1)$$

where d is the etalon length between the mirrors, m is an integer (i.e., axial mode number of interferometer etalon, or order number of interference), n is the refractive index of the etalon medium, and $\lambda$ is the wavelength. In conventional interferometers the value of m is in the range 10–100,000. The present invention utilises a short-etalon interferometer in which m=1. The passband width B (=FWHM) of the interferometer is a function of the reflectance r of the mirrors and the etalon length d:

$$B = \frac{1-r}{\sqrt{r}} \frac{\lambda^2}{2\pi d} \quad (m) \quad (2)$$

The free spectral range FSR between the spectral lines corresponding to different values of interferometer order number means the spacing between the adjacent transmitted wavelengths. The FSR can be computed from Eq. (2) for values m and m+1 of the order number m:

$$\lambda_m - \lambda_{m+1} = \frac{2nd}{m} - \frac{2nd}{m+1} = \frac{2nd}{m(m+1)} \quad (m) \quad (3)$$

As is evident from Eq. (3), the FSR increases when m is decreased. A large value of FSR makes the cancellation of spectral lines of adjacent interferometer order numbers easy by means of, e.g., a cut-off filter. In an interferometer fabricated by virtue of surface micromachining techniques from silicon, the distance d can be 2 µm and m=1. The value of FSR will then be 2 µm. The passband width of the interferometer can be effected by the number of the layers in the multilayer mirror.

Figure 1A:
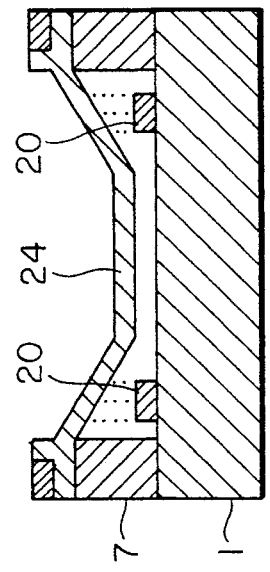
FIG. 1a is a side view of a conventional tunable Fabry-Perot interferometer.
Figure 1B:
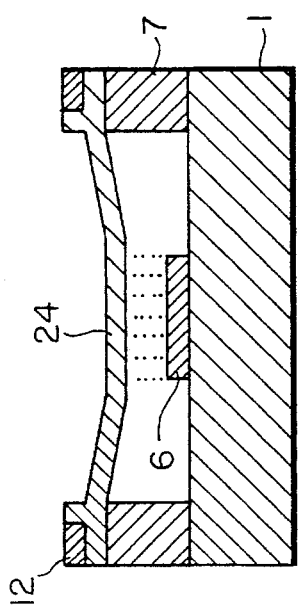
FIG. 1b is a side view of a tunable Fabry-Perot interferometer according to the invention.

The conventional electrode configuration of the interferometer shown in FIG. 1a can maximally offer a control range of one-third of the rest length of the interferometer etalon. Such a Fabry-Perot interferometer typically comprises a substrate 1, a layer 7 determining the rest length of the interferometer etalon, an electrode 6 fabricated onto the substrate 1, and a movable, transparent mirror fabricated onto the layer 7 with such a structure that the center area 24 of the mirror performs as both the optical area and the movable electrode. As is evident from FIG. 1b, the interferometer construction according to the invention provides a much wider control range than the conventional configuration. This is achieved by arranging the upper mirror center area 24 to move by a lever action at a much larger amplitude than the average displacement of the mirror part facing the electrodes 20, where the displacement amplitude can maximally be approximately one-third of the rest length of the interferometer etalon. The electric field causing the electrostatic attraction force is schematically indicated by dotted lines.

Figure 1C:
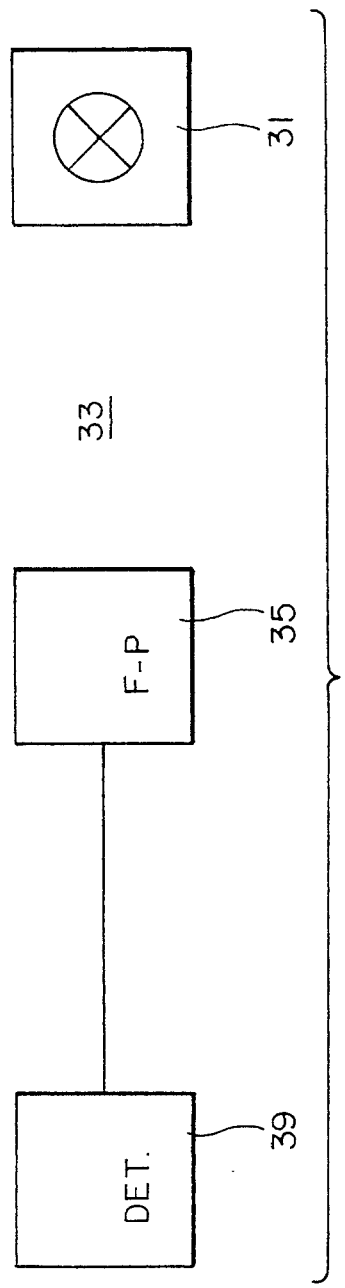
FIG. 1c is a block diagram of the measurement configuration for the interferometer according to the invention.

With reference to FIG. 1c, the measurement configuration comprises a light source 31, which emits radiation toward an optical measurement channel 33. With the help of the tunable Fabry-Perot interferometer 35, the radiation passing through the optical measurement channel can be filtered in a desired manner by adjusting the length of controllable interferometer 35. The optically filtered signal is detected by means of a detector 39 as the signal intensity, phase or other suitable variable.

Figure 2:
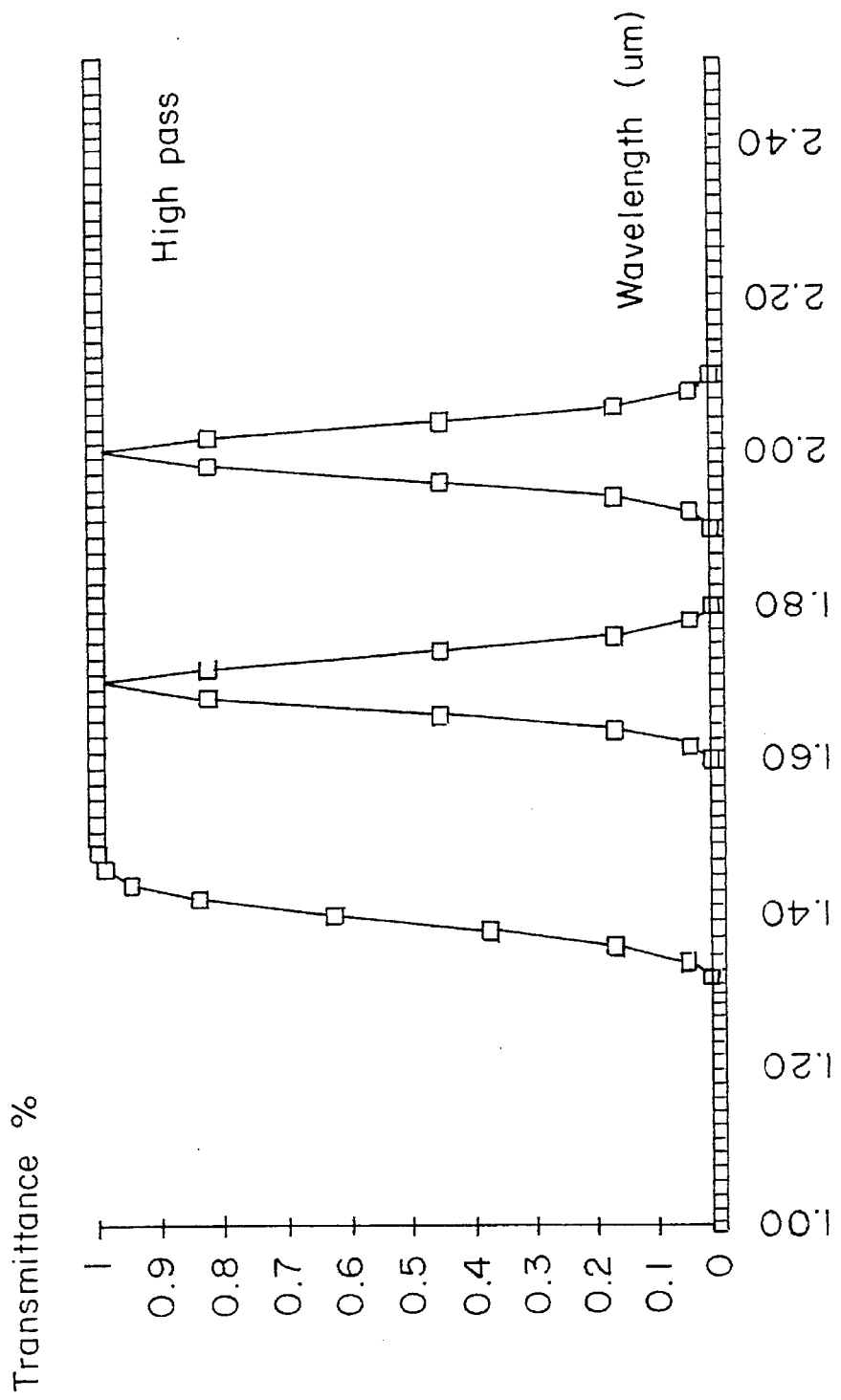
FIG. 2 is a graph showing the passband curves of an interferometer embodiment according to the invention at two different lengths of the interferometer.

With reference to FIG. 2, the passband of a Fabry-Perot interferometer is plotted for two different lengths of the interferometer etalon. At zero deflection voltage the interferometer passband is centered at 2 μm, and with the deflection voltage applied, at 1.7 μm.

A Fabry-Perot interferometer can be operated in both a transmissive as well as reflective mode. The former mode involves the use of the interferometer as a narrow band-pass filter, while the latter mode offers interferometer operation as a bandstop filter, meaning that all other spectral wavelengths are rejected back except a narrow wavelength band.

With reference to FIG. 3, the interferometer structure is fabricated onto a silicon wafer 1 which acts as the body piece of the interferometer. The layer 2 is of silicon nitride and the layer 3 is of polysilicon. The layer 4 is of silicon dioxide and the layer 5 is of polysilicon, of which a region 6 is doped into a conducting bottom electrode with a circular shape. The layer 7 determining the rest length of the interferometer is of silicon dioxide, of which an inner part is etched away to form an etalon cavity 8. In the embodiment discussed herein, the layer 7 is etched away entirely (contrary to what is illustrated in the diagram), because the etching holes 28 are located close to the rim region of the etalon cavity 8. The cavity formed by the etching-away of the silicon dioxide acts as the etalon between the interferometer mirrors. The layer 9 is of polysilicon, of which the regions hatched dark in the diagram are doped in the same fashion as the region 6 of layer 5. The layer 10 is of silicon dioxide, which is patterned. The layer 11 is of polysilicon, whose doped regions are hatched dark in the diagram. The upper mirror 41 of the interferometer is formed by the center parts of layers 9, 10 and 11. The lower mirror 26 is formed by layers 2, 3, 4 and 5. The silicon nitride layer 13 is an anti-reflection layer. The structure described herein is usable in the IR range from 1 μm to longer wavelengths.

The undoped silicon of layers 5, 9 and 11 performs both as a mechanical support and an isolating dielectric layer. This permits the different parts of the same silicon layer to be taken to different potentials without any possibility of a short circuit between the parts.

The interferometer can be controlled by applying a voltage over the metal contacts 12, whereby the electrostatic force pulls the upper mirror downward, thus shortening the interferometer etalon. When electrodes of the optical area are made of doped polysilicon and dielectric isolation between the electrodes is made of undoped or weakly doped silicon, an entirely planar structure is achieved. As the optical properties of a weakly doped polysilicon layer are almost identical to those of an undoped polysilicon layer, also the electrode region can be utilized as a part of the optical area.

Figure 4:
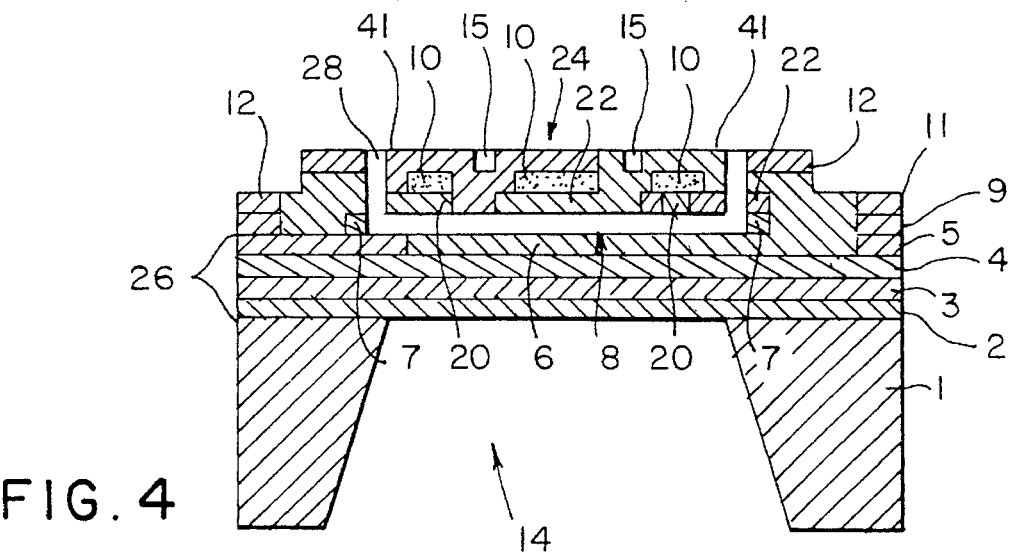
FIG. 4 is a sectional side view of a Fabry-Perot interferometer embodiment according to the invention adapted for operation at visible light wavelengths.

Because the silicon substrate wafer 1 would absorb all radiation of the VIS range (visible light), this is overcome by providing the interferometer structure with a hole 14 formed by etching in the fashion shown in FIG. 4. The holes 28 serve for permitting etching-away of the silicon dioxide from inside the interferometer etalon. The optical area 24 of the interferometer is situated within the perimeter of the holes 28. The optical area 24 is surrounded by a thinned annulus 15 within which the upper mirror 41 stays planar over the entire control range of the interferometer etalon length. The control voltage is applied to the center electrode 22 of the upper mirror 41 via the conducting regions of the layer 11. The holes 28 must be located outside the optical area 24 of the interferometer, advantageously divided at equal spacings along a circle. The shape of the holes 28 may be varied in a wide range from small circular holes up to slot-shaped holes elongated in the radial direction of the interferometer area.

The etalon 8 of the interferometer is advantageously formed by etching-away via the holes 28. To keep the optical area 24 planar, a thinned annular region 15 acting as the flexing region must be fabricated about the optical area 24.

The interferometer typically has a diameter of approx. 1 mm, of which the diameter of the optical area is approx. 0.5 mm. The external dimensions of the interferometer can be, e.g., 2 mm by 2 mm. The different layers of the mirrors are a few hundred nanometer thick and the length of the etalon is from less than one micrometer to a few micrometers depending on the wavelength range required.

The mechanical control range is from the etalon rest length to zero. The optical control range is dependent on the structure of the mirrors which determines their reflection coefficient as a function of wavelength. Metallized mirrors offer the widest optical control range, while multilayer dielectric mirrors achieve a control range of approximately half the rest wavelength.

Figure 5:
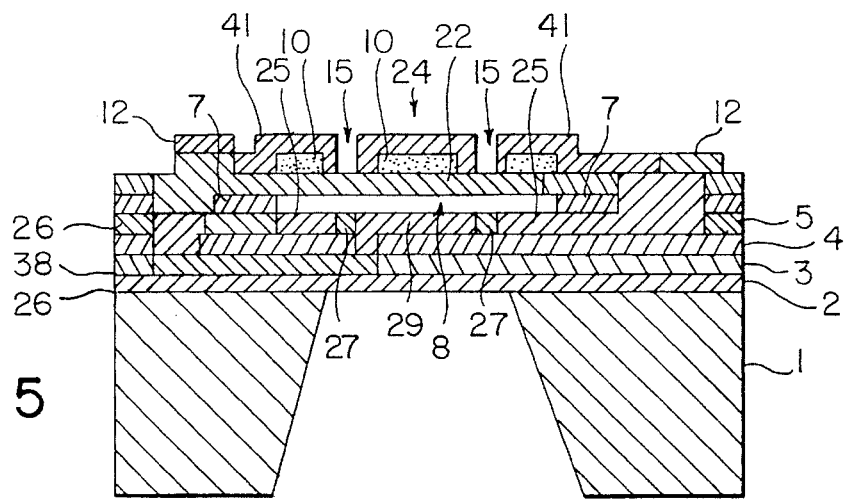
FIG. 5 is a sectional side view of another Fabry-Perot interferometer embodiment according to the invention adapted for operation at visible light wavelengths.

With reference to FIG. 5, an alternative interferometer construction is shown. The voltage applied to a center electrode 29 is taken via a conducting path 38 formed by doping to the lower silicon layer of the lower mirror. The center electrode 29 is isolated by a dielectric layer 27 from the ring electrode structure 25 of the lower mirror. The center electrode structure 29 of the lower mirror 26 is taken to the same potential with the electrode structure 22 of the upper mirror 41 in order to discharge static charges from the center electrode structure 29.

Figure 6:
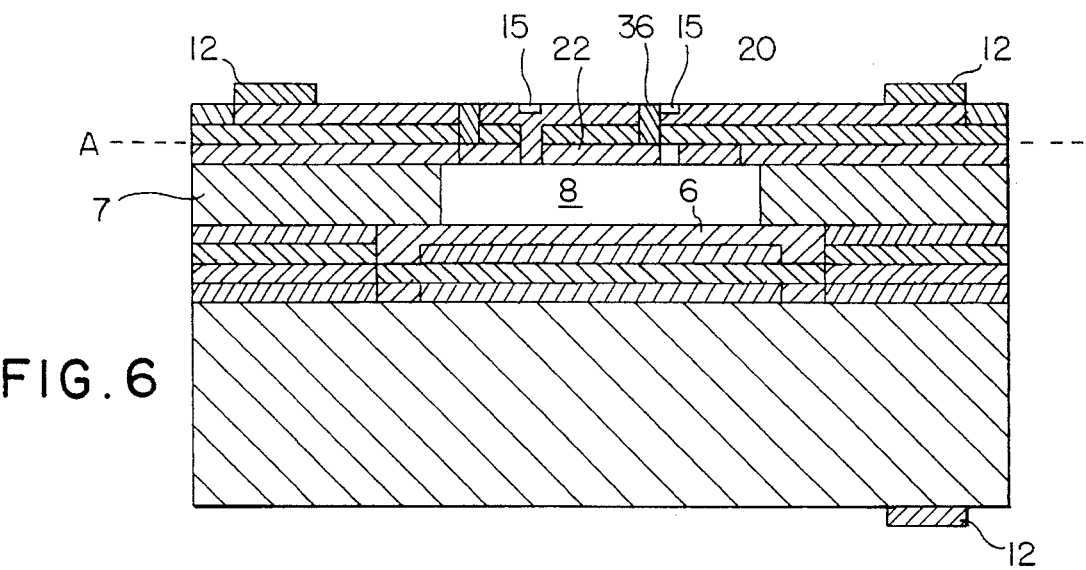
FIG. 6 is a sectional side view of another Fabry-Perot interferometer embodiment according to the invention adapted for operation at wavelengths at which silicon is transmissive.
Figure 7:
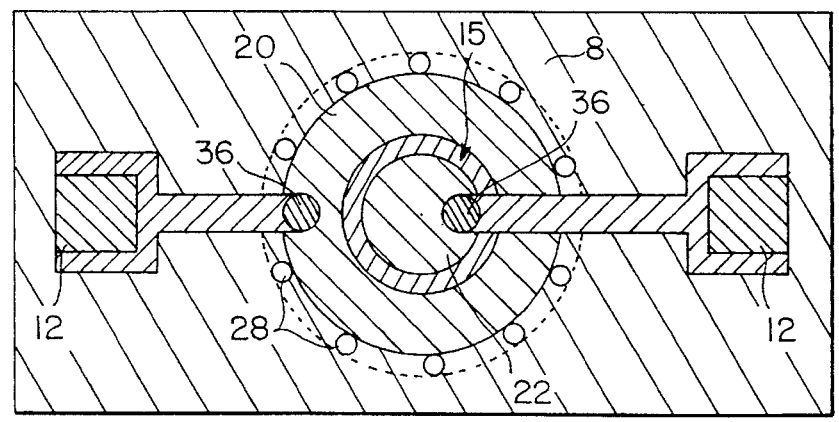
FIG. 7 is a top view of the Fabry-Perot interferometer shown in FIG. 6 sectioned at the electrodes.

With reference to FIG. 6, an alternative interferometer construction 2 is shown. In this construction the voltages applied to the upper center electrode 22 and the ring electrode 20 are taken via silicon-filled auxiliary holes 36 made to the silicon dioxide layer. This structure can be configured into a three-terminal circuit.

To those versed in the art it is obvious that the electrical vias can be implemented in multiple different manners, of which those described above must be understood as examples of the prior art and nonlimiting to the spirit of the invention.

Accordingly, the characterizing properties of the present invention include a wider control range achieved by virtue of the ring electrode structure, a thinned annulus 15 surrounding the optical area 24, by virtue of which the optical area 24 remains planer over the entire control range, and the use of undoped or weakly doped polysilicon as the dielectric isolation.

With reference to FIG. 3, the details of the interferometer construction are described below in an exemplifying manner elucidating the manufacturing process of the interferometer.

The supporting substrate material is a silicon wafer 1 with a typical thickness of 0.5 mm, doping level less than $10^{15}$ atoms/cm$^3$ and (100) crystal orientation. Onto the upper surface of this wafer is grown a λ/4 layer 2 of silicon nitride.

Next, onto the silicon nitride layer 2 is grown a λ/4 layer 3 of undoped polycrystalline silicon, onto which is then grown a λ/4 layer 4 of silicon dioxide. Onto the silicon dioxide layer 4 is grown a λ/4 layer 5 of undoped polysilicon.

Onto the layer 5 is applied a photoresist layer and the photoresist is patterned. Subsequently, the silicon is subjected to ion-implantation of phosphorus, boron or arsenic atoms using a dopant concentration of approx. $10^{14}$ atoms/cm$^3$. The resist is next removed. Onto the patterned layer 5 is grown a λ/2 layer 7 of silicon dioxide from which desired parts of the dioxide are removed until the structure 7 shown in FIG. 3 remains.

On this structure is grown a λ/4 layer 9 of undoped polysilicon, onto which a photoresist layer is applied and the photoresist is patterned. Ion-implantation is performed with phosphorus, boron or arsenic atoms and the photoresist is removed.

Next, a λ/4 layer 10 of silicon dioxide is grown and patterned to give the structure 10 shown in FIG. 3. Onto this layer is grown a λ/4 layer 11 of undoped polysilicon, a photoresist layer is applied and the photoresist is patterned. Ion-implantation is performed with phosphorus, boron or arsenic atoms and the photoresist is removed.

Followingly, new photoresists are applied and patterned for micromachining the holes 28 and the thinned region 15 and etching-away the dioxide from the layer 7 via the holes 28 in order to form the etalon cavity 8. Next, the metal contact pads 12 are made by, e.g., vacuum evaporation or sputtering through a mechanical mask. The metal layer 12 may be a multilayer metallization. Finally, any films possibly applied to the lower surface of the wafer are removed and replaced by growing a λ/4 layer 13 of silicon nitride onto the lower surface.

We claim:

1. An electrostatically tunable Fabry-Perot interferometer comprising:
   a body block;
   a first mirror structure mounted on said body block, said first mirror structure being semitransmitting and movable relative to said body block, said first mirror including an optical area and structurally weakened regions adjacent to a periphery of said optical area, wherein said structurally weakened regions result in said optical area maintaining an initial shape during movement of said first mirror structure;
   a second mirror structure mounted on said body block, said second mirror being parallel to and spaced from said first mirror structure;
   a first electrode structure, integral with said first mirror structure; and
   a second electrode structure, integral with said second mirror structure, wherein at least one of said first and second electrode structures includes an electrode outside said optical area.

2. A Fabray-Perot interferometer as defined in claim 1, wherein an electrode of said first electrode structure surrounds said optical area.

3. A Fabry-Perot interferometer as defined in claim 1, wherein said electrode of said at least one of said first and second electrode structures is a ring electrode with a circular shape.

4. A Fabry-Perot interferometer as defined in claim 1, wherein an electrode of said second electrode structure surrounds said optical area.

5. A Fabry-Perot interferometer as defined in claim 3, further comprising a center electrode inside said ring electrode, and a region inside said ring electrode surrounding said optical area, said region including an isolating region and a conducting region wherein said isolating region separates said ring electrode from said conducting region which is connected to the potential of said center electrode.

6. A Fabry-Perot interferometer as defined in claim 1, wherein said structurally weakened regions are annular thinned regions.

7. A Fabry-Perot interferometer as defined in claim 5, wherein said isolating region is undoped or weakly doped polysilicon.

8. A Fabry-Perot interferometer as defined in claim 5, wherein said control electrode is doped polysilicon and said isolating region is undoped or weakly doped polysilicon.

9. A Fabry-Perot interferometer as defined in claim 1, wherein said electrode of said at least one of said first and second electrode structures outside said optical area completely surrounds said optical area.

10. A Fabry-Perot interferometer as defined in claim 1, wherein said first electrode structure is part of said optical area.

11. A Fabry-Perot interferometer as defined in claim 1, wherein said at least one of said first and second electrode structures surrounds said structurally weakened regions.

12. A Fabry-Perot interferometer as defined in claim 1, wherein said initial shape is planar.

13. A method of maintaining an initial shape of an optical area of a movable mirror in a Fabry-Perot interferometer during deflection of said movable mirror comprising the steps of:
   providing structurally weakened regions adjacent to a periphery of said optical area;
   positioning another mirror having another optical area parallel to and spaced away from said movable mirror;
   surrounding at least one of said optical area and said another optical area with an electrode;
   applying a voltage to said electrode; and
   bending said movable mirror at said structurally weakened regions in response to said applying, thereby moving said optical area relative to said another optical area while maintaining an initial shape of said optical area.

14. The method as defined in claim 13, wherein said surrounding further comprises surrounding said structurally weakened regions.

15. The method as defined in claim 13, further comprising providing a center electrode in at least one of said optical area and said another optical area.

16. The method as defined in claim 15, further comprising isolating said center electrode and said electrode.

17. A Fabry-Perot interferometer as defined in claim 1, wherein said optical area has a diameter of at least approximately 0.5 mm.

\* \* \* \* \*